(12) United States Patent
Matsumoto et al.

(10) Patent No.: US 12,362,102 B2
(45) Date of Patent: Jul. 15, 2025

(54) ELECTROLYTIC CAPACITOR

(71) Applicant: Panasonic Intellectual Property Management Co., Ltd., Osaka (JP)

(72) Inventors: Takayuki Matsumoto, Saga (JP); Nobuhiro Tanigaki, Saga (JP); Nobuyuki Yamaguchi, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 18/254,874

(22) PCT Filed: Dec. 10, 2021

(86) PCT No.: PCT/JP2021/045457
§ 371 (c)(1),
(2) Date: May 29, 2023

(87) PCT Pub. No.: WO2022/138223
PCT Pub. Date: Jun. 30, 2022

(65) Prior Publication Data
US 2024/0029962 A1 Jan. 25, 2024

(30) Foreign Application Priority Data
Dec. 25, 2020 (JP) ................................ 2020-217859
Dec. 25, 2020 (JP) ................................ 2020-217860

(51) Int. Cl.
*H01G 9/012* (2006.01)
*H01G 9/10* (2006.01)
*H01G 9/15* (2006.01)

(52) U.S. Cl.
CPC ............... *H01G 9/012* (2013.01); *H01G 9/10* (2013.01); *H01G 9/15* (2013.01)

(58) Field of Classification Search
CPC ...................................................... H01G 9/012
(Continued)

(56) References Cited

U.S. PATENT DOCUMENTS

2007/0081301 A1* 4/2007 Tanaka ................... H01G 2/065
361/540
2008/0002335 A1 1/2008 Kurita et al.
(Continued)

FOREIGN PATENT DOCUMENTS

JP 2006-270014 10/2006
JP 2015-088718 5/2015
WO WO-2014174833 A1 * 10/2014 ............... H01G 2/06

OTHER PUBLICATIONS

International Search Report of PCT application No. PCT/JP2021/045457 dated Mar. 1, 2022.

*Primary Examiner* — Eric W Thomas
(74) *Attorney, Agent, or Firm* — Rimon P.C.

(57) ABSTRACT

An electrolytic capacitor includes a capacitor element having a bottom surface and an upper surface, an anode lead terminal, and outer packaging resin. The electrode lead terminal includes a terminal portion and two anchor portions. The terminal portion has a principal surface exposed from the bottom surface, and has an end side along a longitudinal direction of the anode lead. Each of the two anchor portions includes an upright portion that rises from an end side of the terminal portion toward the upper surface. The upright portion has a first region exposed from the bottom surface in a vicinity of a boundary with the end side, the first region has an inclined surface continuous with the principal surface of the terminal portion, and the inclined surface is inclined to form an obtuse angle with the principal surface of the terminal portion.

19 Claims, 10 Drawing Sheets

(58) Field of Classification Search
USPC .......................................................... 361/540
See application file for complete search history.

(56) References Cited

U.S. PATENT DOCUMENTS

| | | | |
|---|---|---|---|
| 2009/0128998 A1* | 5/2009 | Matsuoka | H01G 9/012 |
| | | | 361/532 |
| 2015/0116909 A1 | 4/2015 | Kwak et al. | |
| 2016/0093447 A1* | 3/2016 | Kato | H01G 9/10 |
| | | | 361/540 |

* cited by examiner

ELECTROLYTIC CAPACITOR

TECHNICAL FIELD

The present disclosure relates to an electrolytic capacitor.

BACKGROUND

Electrolytic capacitors are mounted on various electronic devices. An electrolytic capacitor usually includes a capacitor element including an anode part and a cathode part, an anode lead terminal, a cathode lead terminal, and an exterior body covering the capacitor element. The anode lead terminal is electrically connected to the anode part, and the cathode lead terminal is electrically connected to the cathode part.

Conventionally, lead terminals having various shapes have been proposed (for example, Unexamined Japanese Patent Publication No. 2015-088718). Unexamined Japanese Patent Publication No. 2015-088718 discloses a tantalum capacitor including an anode lead frame having an extension part serving to enhance fixing strength with a molding portion.

SUMMARY

A lead terminal includes a terminal portion having a principal surface that can be a mounting surface on a printed circuit board or the like, and a part of the terminal portion is embedded in outer packaging resin while the principal surface of the terminal portion is exposed from a bottom surface of an electrolytic capacitor. However, the terminal portion may be separated from the outer packaging resin due to expansion of the lead terminal during the reflow . treatment, and improvement in terminal strength is required. Further, it is also required to improve connection strength between the principal surface of the terminal portion and a printed circuit board or the like by soldering. In the anode lead frame described in Unexamined Japanese Patent Publication No. 2015-088718, terminal strength and connection strength are insufficient.

An electrolytic capacitor according to a first aspect of the present disclosure includes a bottom surface, and an upper surface opposite to the bottom surface, and includes a capacitor element including an anode lead, an anode lead terminal and a cathode lead terminal each electrically connected to the capacitor element, and outer packaging resin disposed around the capacitor element. At least one of the anode lead terminal or the cathode lead terminal is constituted by a metal sheet, and includes a terminal portion and two anchor portions. The terminal portion is partially exposed from the bottom surface, and the two anchor portions extend from the terminal portion toward the inside of the outer packaging resin. The terminal portion has a principal surface exposed from the bottom surface, and has an end side along a longitudinal direction of the anode lead. Each of the two anchor portions includes an upright portion that rises from the end side of the terminal portion toward the upper surface, and an extension portion that bends to extend from an upper end of the upright portion. The upright portion has an exposed region exposed from the bottom surface in a vicinity of a boundary with the end side. The exposed region of the upright portion has an inclined surface continuous with the principal surface of the terminal portion, and the inclined surface is inclined to form an obtuse angle with the principal surface of the terminal portion.

According to the first aspect of the present disclosure, in the electrolytic capacitor, it is possible to increase connection strength between the terminal portion and a printed board or the like while increasing terminal strength.

Further, the anode lead frame described in UnexamineD Japanese Patent Publication No. 2015-088718 includes an anode terminal including two supports (protrusions). When a tantalum capacitor is mounted on a board, the anode terminal and the board are joined to each other by soldering. From the viewpoint of solder fillet formation, tips of the two supports are slightly exposed from ends of bottom surfaces of the tantalum capacitors.

However, a resin burr is likely to remain between the tips of the two supports at the time of formation of a molding portion. A resin burr remaining between tips of the two supports falls off when the tantalum capacitor is mounted on the board, and a mounting failure (solder height failure or the like) is likely to occur.

The electrolytic capacitor according to a second aspect of the present disclosure includes a bottom surface, and an upper surface opposite to the bottom surface, and includes a capacitor element including an anode lead, an anode lead terminal and a cathode lead terminal each electrically connected to the capacitor element, and outer packaging resin disposed around the capacitor element. The anode lead terminal is constituted by a metal sheet and includes an anode terminal and an anode connection portion. The anode terminal has a first principal surface and a second principal surface opposite to the first principal surface. The anode connection portion is electrically connected to a tip of the anode lead. The first principal surface is exposed from the bottom surface. The anode terminal has a first region, a second A region, and a second B region. The first region is located at the center of the anode terminal. The second A region and the second B region are respectively located on both sides of the first region. The anode connecting part rises from the first region toward the upper surface. Each of the second A region and the second B region includes a protrusion extending from the first region. The protrusion has a tip protruding from an end of the bottom surface. Each of the protrusion in the second A region and the protrusion in the second B region has a side surface continuous with the first principal surface and the second principal surface. The side surface of the protrusion in the second A region and the side surface of the protrusion in the second B region face each other, and are inclined in directions different from each other with respect to the first principal surface and the second principal surface.

According to the second aspect of the present disclosure, a mounting failure of the electrolytic capacitor can be prevented.

DESCRIPTION OF EMBODIMENT

First Exemplary Embodiment

Figure 1:
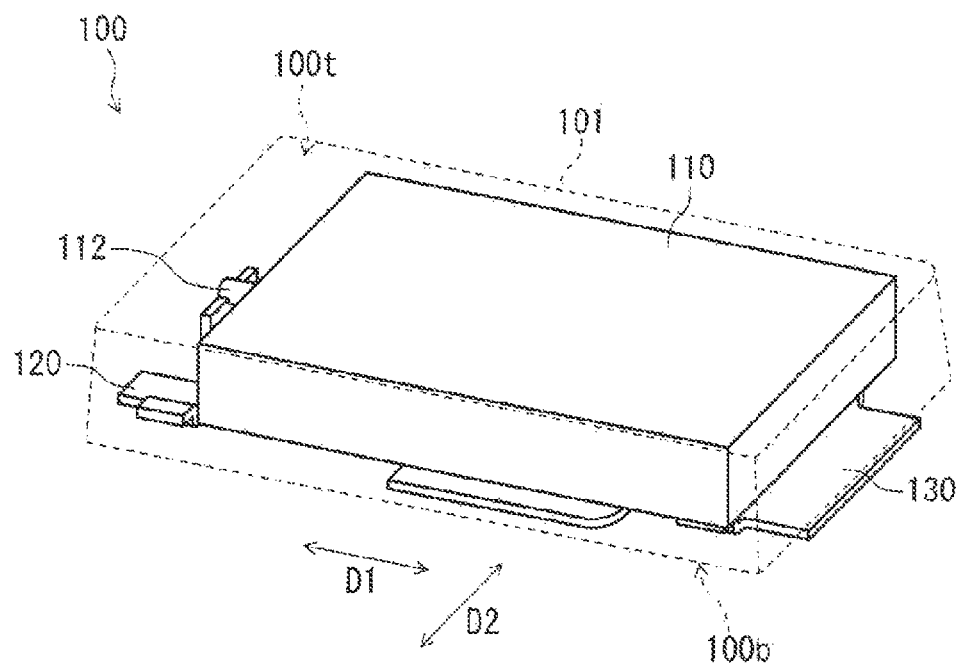
FIG. 1 is a perspective view schematically illustrating a configuration of an example of an electrolytic capacitor of a first embodiment.

Hereinafter, a first exemplary embodiment of the present disclosure will be described with reference to an example, but the present disclosure is not limited to the example to be described below. In description below, specific numerical values and materials may be provided as examples, but other numerical values and materials may be applied as long as the effect of the present disclosure can be obtained. Note that constituent elements of known electrolytic capacitors may be applied to constituent elements other than parts that are characteristics of the present disclosure.

(Electrolytic Capacitor)

An electrolytic capacitor of the present disclosure includes a bottom surface, and an upper surface opposite to the bottom surface. Hereinafter, the bottom surface and the upper surface may be referred to as "bottom surface (B)" and "upper surface (T)". An electrolytic capacitor of the present disclosure includes a capacitor element including an anode lead, an anode lead terminal and a cathode lead terminal each electrically connected to the capacitor element, and outer packaging resin disposed around the capacitor element.

At least one of the anode lead terminal or the cathode lead terminal is constituted by a metal sheet, and includes a terminal portion partially exposed from bottom surface (B) and two anchor portions each extending from the terminal portion toward the inside of the outer packaging resin. The lead terminal including the two anchor portions may be referred to as "lead terminal (L)". The terminal portion has a principal surface exposed from bottom surface (B). Hereinafter, the principal surface may be referred to as "principal surface (S1)".

The terminal portion includes two end sides along a direction in which the anode lead extends (a longitudinal direction of the anode lead). Hereinafter, the direction may be referred to as "direction (D1)", and a direction perpendicular to direction (D1) may be referred to as "direction (D2)". Further, the end side may be referred to as "end side (E)". Each of the two anchor portions includes an upright portion that rises from end side (E) toward upper surface (T), and an extension portion that bends to extend from an upper end of the upright portion.

The upright portion (excluding exposed region (A) to be described later) and the extension portion of the anchor portion are embedded in the outer packaging resin. Furthermore, a metal sheet constituting lead terminal (L) is bent at two points of a boundary between the terminal portion and the upright portion and a boundary between the upright portion and the extension portion. According to this configuration, a direction in which the upright portion extends is different from a direction in which the extension portion extends. Accordingly, the anchor portion exhibits a high anchor effect. Thus, according to the present disclosure, it is possible to suppress separation of lead terminal (L) from the outer packaging resin. That is, according to the present disclosure, an electrolytic capacitor having high terminal strength and reliability can be obtained.

Each of the upright portions of the two anchor portions has a region exposed from bottom surface (B) in the vicinity of a boundary with end side (E). Hereinafter, the region may be referred to as "exposed region (A)". A part of the terminal portion in a thickness direction is exposed from bottom surface (B) (the terminal portion is disposed such that principal surface (S1) slightly protrudes from an outer surface of the outer packaging resin), so that exposed region (A) may be formed. Exposed region (A) can also serve as a terminal portion, and can serve as a joint portion with a board by soldering together with the terminal portion.

Exposed region (A) has an inclined surface continuous with principal surface (S1). Hereinafter, the inclined surface may be referred to as "inclined surface (S2)". Inclined surface (S2) is inclined so as to form an obtuse angle with principal surface (S1). As inclined surface (S2) is provided, an excellent solder fillet is easily formed at a joint portion between the terminal portion and the board by soldering, and connection strength between the terminal portion and the board is increased. The two anchor portions can play a role of improving connection strength of the terminal portion as well as a role of improving terminal strength by the anchor effect.

Two inclined surfaces (S2) are each formed along end side (E), and two inclined surfaces (S2) are provided on both sides in direction (D2) of the terminal portion. Therefore, in particular, connection strength with respect to direction (D2) can be effectively enhanced. Such two inclined surfaces (S2) can be formed by utilizing rising of the upright portions of the two anchor portions from end sides (E). The upright portion may rise substantially at a right angle (for example, more than 80° and less than 100°) with respect to the terminal portion, or may rise in an inclined manner so as to form an obtuse angle (for example, in a range from 100° to 150°, inclusive) with the terminal portion.

Inclination angle θ of inclined surface (S2) with respect to principal surface (S1) is, for example, 135° to 175°, and may be 145° to 165°. Here, inclination angle θ is an angle formed by principal surface (S1) and inclined surface (S2) in a cross section perpendicular to direction (D1) of the electrolytic capacitor (a cross section including the terminal portion and the upright portion of lead terminal (L)) or when the electrolytic capacitor is viewed from direction (D1). In the cross section (or when the electrolytic capacitor is viewed from direction (D1)), a contour of inclined surface (S2) may be linear or a curved shape with a slightly bulged arc. In the case of the curved shape, inclination angle θ refers to an angle formed by a line segment (chord) connecting both ends of a curve (arc) and the principal surface. Note that, in the curve, one end is a boundary between inclined surface (S2) and principal surface (S1) (end side (E)), and the other end is a portion where the upright portion starts to be exposed from bottom surface (B).

Size of the anchor portion is not particularly limited as long as the anchor effect can be obtained. An example of size of the anchor portion will be described below.

The two anchor portions included in one lead terminal (L) are usually symmetrical with respect to a plane perpendicular to bottom surface (B) and passing through a central axis of the anode lead, but do not need to be symmetrical. In a case where each of the anode lead terminal and the cathode lead terminal includes the anchor portion, a shape of the anchor portion of the anode lead terminal and a shape of the anchor portion of the cathode lead terminal may be the same or different.

In the electrolytic capacitor of the present disclosure, an entire surface of the extension portion is in contact with the outer packaging resin. From another point of view, in the electrolytic capacitor of the present disclosure, the anchor portion is preferably not in contact with the capacitor element. According to these configurations, a high anchor effect can be obtained.

The two anchor portions may be bent in different directions (reverse rotation directions) at the boundary between the terminal portion and the upright portion and the boundary between the upright portion and the extension portion. Here, bent in different directions means that a metal sheet constituting lead terminal (L) is bent such that one surface (surface on a side of upper surface (T)) of the metal sheet is a valley at the boundary between the terminal portion and the upright portion, and is bent such that the one surface is a mountain at the boundary between the upright portion and the extension portion. More specifically, the extension portions of the two anchor portions may be bent from the upper end of the upright portion and extend away from each other. That is, the extension portions of the two anchor portions may be bent from the upper end of the upright portion and extend to be away from each other in a direction perpendicular to a direction in which the anode lead extends. The anchor portion having this configuration is easily formed. Further, in a case where the anchor portion having this configuration is used, it is easy to perform filling with a material (mold resin or the like) of the outer packaging resin. Note that the two anchor portions may be bent in the same direction (the same rotation direction) at the boundary between the terminal portion and the upright portion and the boundary between the upright portion and the extension portion.

In the electrolytic capacitor of the present disclosure, each of the anode lead terminal and the cathode lead terminal may include two anchor portions. According to this configuration, an electrolytic capacitor having particularly high terminal strength and reliability can be obtained. Alternatively, only the anode lead terminal may include the two anchor portions, or only the cathode lead terminal may include the two anchor portions.

Hereinafter, an example of constituent elements of the electrolytic capacitor of the present disclosure will be described.

Anode Lead Terminal

The anode lead terminal may be formed by processing one metal sheet by a known metal processing method. A material of the anode lead terminal may be any material that can be used as the material of the anode lead terminal of the electrolytic capacitor. For example, a material of a known anode lead terminal used for the electrolytic capacitor may be used. The anode lead terminal may be formed by processing a metal sheet (including a metal plate and a metal foil) made from metal (copper, copper alloy, and the like). A surface of the metal sheet may be subjected to plating such as nickel plating or gold plating. A thickness of the metal sheet constituting the anode lead terminal may be in a range from 25 μm to 200 μm, inclusive (for example, in a range from 25 μm to 100 μm, inclusive).

The anode lead terminal may include an anode terminal exposed from bottom surface (B), and a wire connection part rising from the anode terminal toward upper surface (T). As described above, two anchor portions may extend from the anode terminal. The anode lead of the capacitor element is connected to the wire connection part. The wire connection part may include a wire reception part bent at its tip so as to be substantially parallel to bottom surface (B). The wire reception part may be bent toward a front surface of the capacitor element or may be bent in an opposite direction. Here, the front surface of the capacitor element is a surface facing an end surface of the capacitor element from which a wire protrudes. The wire reception part enables reliable and easy connection between the wire connection part and the anode lead.

Cathode Lead Terminal

The cathode lead terminal may be formed by processing one metal sheet by a known metal processing method. A material of the cathode lead terminal may be any material that can be used as a material of the cathode lead terminal of the electrolytic capacitor. For example, a known cathode lead terminal material used in an electrolytic capacitor may be used. The cathode lead terminal may be formed of the metal sheet exemplified as the material of the anode lead terminal.

The cathode lead terminal may include a cathode terminal exposed from bottom surface (B), and a connection part electrically connected to a cathode part of the capacitor element. The cathode part of the capacitor element is electrically connected to the cathode terminal via the connection part. As described above, the two anchor portions may extend from the cathode terminal.

Capacitor Element

The capacitor element is not particularly limited. As the capacitor element, a capacitor element used in a known solid electrolytic capacitor or a capacitor element having a similar configuration may be used. Note that the electrolytic capacitor of the present disclosure may include a plurality of the capacitor elements. In this case, anode parts of a plurality of capacitors are electrically connected to the anode lead terminal.

An example of the capacitor element includes an anode part and a cathode part. The anode part includes an anode body having a dielectric layer formed on its surface and an anode lead, and the cathode part includes an electrolyte layer and a cathode layer. The electrolyte layer is disposed between the dielectric layer formed on a surface of the anode body and the cathode layer. These constituent elements are not particularly limited, and constituent elements used for known solid electrolytic capacitors may be applied. Examples of these constituent elements will be described below.

Anode Body

As the anode body, for example, a columnar (for example, rectangular parallelepiped) porous sintered body obtained by sintering particles to be a material may be used. Examples of the particles include particles of valve metal, particles of an alloy containing valve metal, and particles of a compound containing valve metal. One of these kinds of particles may be used alone, or two or more of these kinds may be used in mixture. As the valve metal, titanium (Ti), tantalum (Ta), niobium (Nb), or the like is used. Alternatively, the anode body may be formed by roughening a surface of a base material (such as a foil-like or plate-like base material) containing the valve metal by etching or the like.

The anode part may be produced by a method below. First, a part of an anode lead is embedded in metal powder as a material of an anode body, and the metal powder is compression-molded into a columnar shape (for example, a rectangular parallelepiped shape). After the above, the powder of the metal is sintered to form an anode body. In this way, the anode part including the anode body and the anode lead partially embedded in the anode body can be produced.

The dielectric layer formed on a surface of the anode body is not particularly limited, and may be formed by a known method. For example, the dielectric layer may be formed by anodizing a surface of the anode body by immersing the anode body in an anodizing solution. Alternatively, the dielectric layer may be formed by heating the anode body in an atmosphere containing oxygen to oxidize a surface of the anode body.

Anode Lead

The anode lead may be a wire (anode wire) made from metal. Examples of a material of the anode lead include the above-described valve metal, copper, aluminum, and an aluminum alloy. A part of the anode lead is embedded in the anode body, and a remaining part protrudes from the anode body. Note that the anode lead is usually rod-like, but may be plate-like.

Electrolyte Layer

The electrolyte layer is not particularly limited, and an electrolyte layer used in a known solid electrolytic capacitor may be applied. Note that, in the present description, the electrolyte layer may be replaced with a solid electrolyte layer, and the electrolytic capacitor may be replaced with a solid electrolytic capacitor. The electrolyte layer may be a stacked body of two or more different electrolyte layers.

The electrolyte layer is disposed so as to cover at least a part of the dielectric layer. The electrolyte layer may be formed using a manganese compound or a conductive polymer. Examples of the conductive polymer include polypyrrole, polythiophene, polyaniline, and a derivative of these. These polymers may be used alone or in combination of a plurality of polymers. Alternatively, the conductive polymer may be a copolymer from two or more kinds of monomers. Note that the derivative of the conductive polymer means a polymer having the conductive polymer as a basic skeleton. For example, examples of the derivative of polythiophene include poly(3,4-ethylenedioxythiophene) and the like.

A dopant may be added to the conductive polymer. The dopant can be selected depending on the conductive polymer, and a known dopant may be used. Examples of the dopant include naphthalenesulfonic acid, p-toluenesulfonic acid, polystyrenesulfonic acid, and salt of these. An example of the electrolyte layer is formed using poly(3,4-ethylenedioxythiophene) (PEDOT) doped with polystyrenesulfonic acid (PSS).

The electrolyte layer containing the conductive polymer may be formed by polymerizing a raw material monomer on the dielectric layer. Alternatively, the dielectric layer may be formed by applying liquid containing the conductive polymer (and a dopant as necessary) to the dielectric layer and then drying the liquid.

Cathode Layer

The cathode layer may be a conductive layer formed on the electrolyte layer, for example, may be a conductive layer formed so as to cover the electrolyte layer. The cathode layer may include a carbon layer formed on the electrolyte layer, and a metal paste layer formed on the carbon layer. The carbon layer may be formed by a conductive carbon material such as graphite, and resin. The metal paste layer may be formed of metal particles (for example, silver particles) and resin, and may be formed of, for example, silver paste.

The cathode layer is electrically connected to the cathode lead terminal. The cathode layer may be electrically connected to the cathode lead terminal via a conductive member. The conductive member may be formed of metal particles (for example, silver particles) and resin, and may be formed of, for example, silver paste.

Outer Packaging Resin

The outer packaging resin is disposed around the capacitor element so that the capacitor element is not exposed from a surface of the electrolytic capacitor. Furthermore, the outer packaging resin insulates the anode lead terminal from the cathode lead terminal. Known outer packaging resin used for an electrolytic capacitor may be applied to the outer packaging resin. For example, the outer packaging resin may be formed using an insulating resin material used for sealing the capacitor element. Examples of a material of the outer packaging resin include epoxy resin, phenol resin, silicone resin, melamine resin, urea resin, alkyd resin, polyurethane, polyimide, unsaturated polyester, and the like. The outer packaging resin may contain a substance (such as an inorganic filler) other than the resin.

Hereinafter, an example of the electrolytic capacitor of the first exemplary embodiment of the present disclosure will be specifically described with reference to the drawings. The above-described constituent elements can be applied to constituent elements of an electrolytic capacitor as an example described below. Further, constituent elements of an electrolytic capacitor as an example described below can be changed based on the above description. Further, a matter described below may be applied to the exemplary embodiment described above. Further, in the exemplary embodiment described below, constituent elements that are not essential to the electrolytic capacitor of the present disclosure may be omitted.

Figure 2:
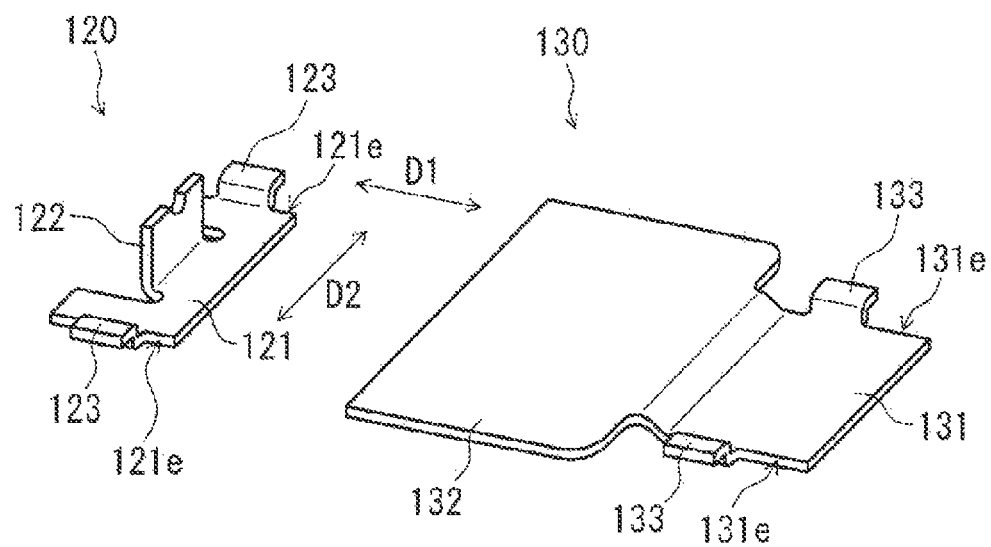
FIG. 2 is a perspective view schematically illustrating a member of a part of the electrolytic capacitor illustrated in FIG. 1.
Figure 3:
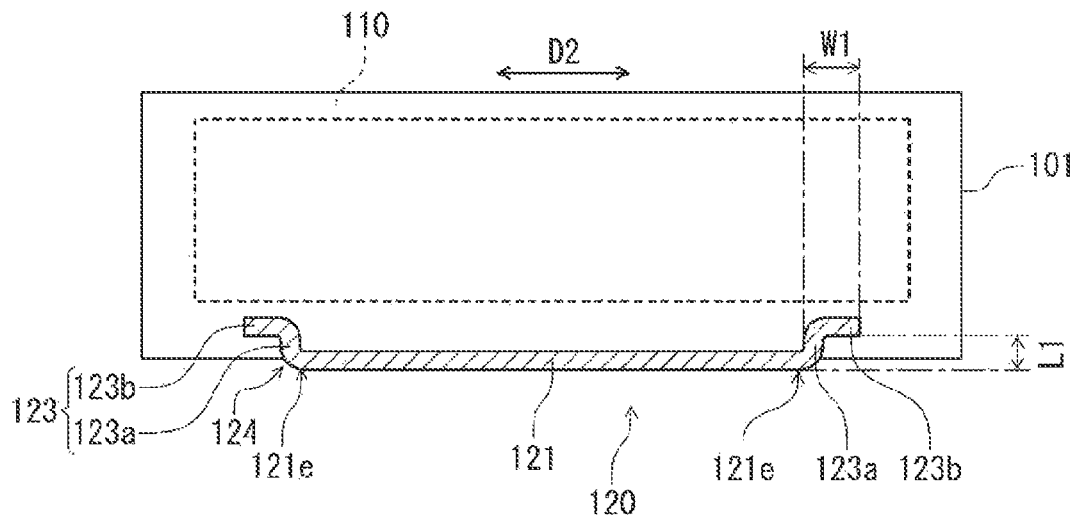
FIG. 3 is a cross-sectional view schematically illustrating an anode lead terminal of the electrolytic capacitor illustrated in FIG. 1.
Figure 4:
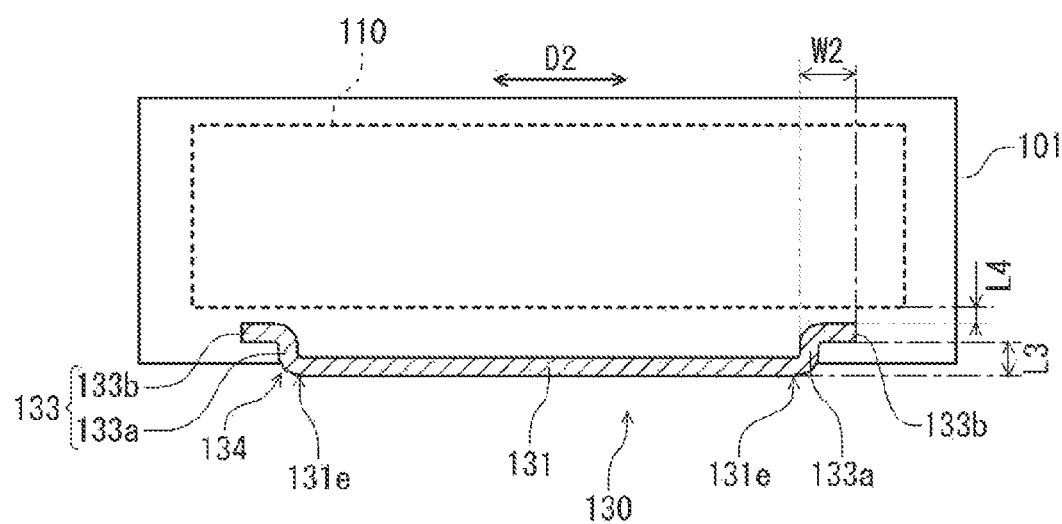
FIG. 4 is a cross-sectional view schematically illustrating a cathode lead terminal of the electrolytic capacitor illustrated in FIG. 1.
Figure 5:
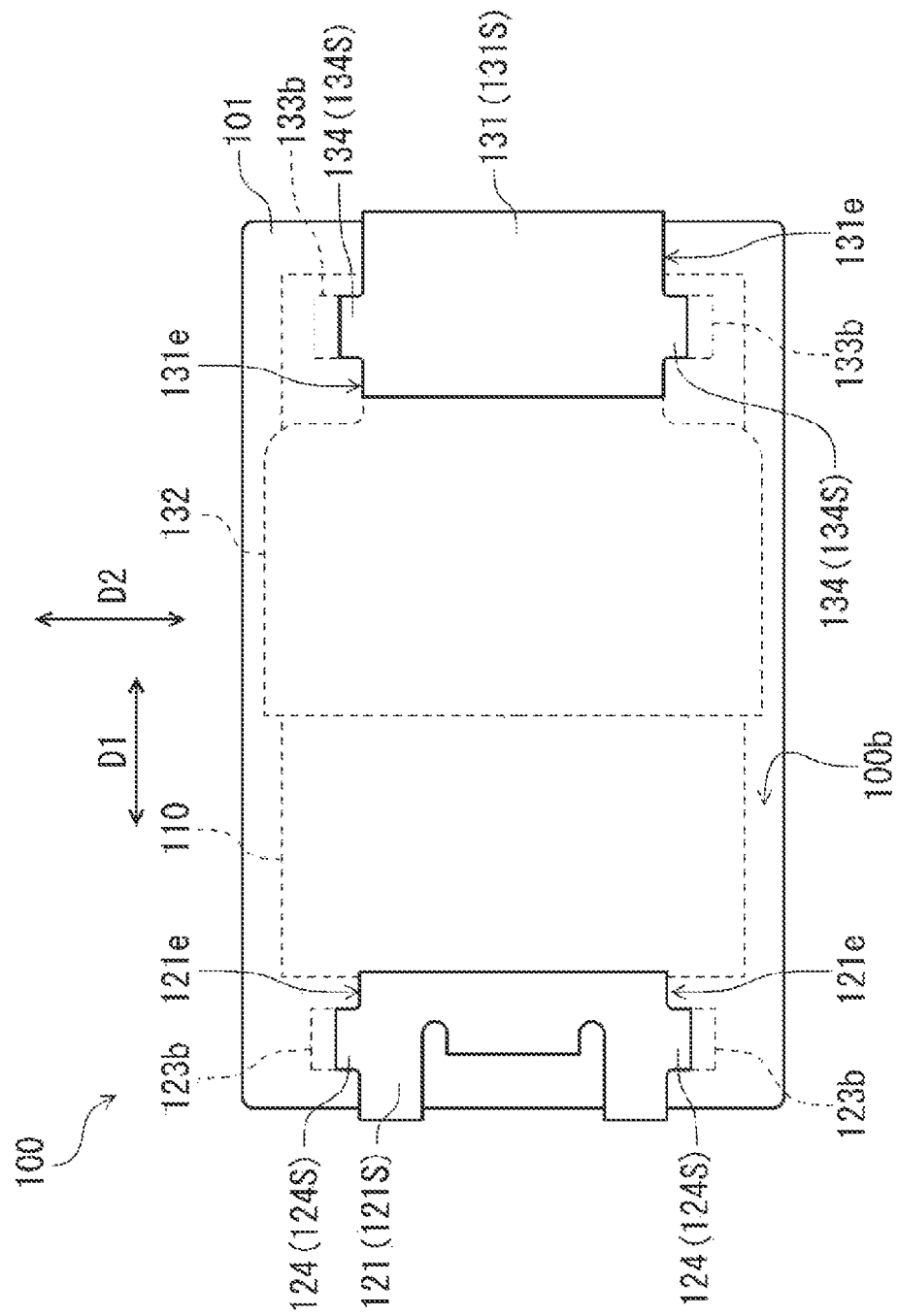
FIG. 5 is a bottom view schematically illustrating the electrolytic capacitor illustrated in FIG. 1.

FIG. 1 schematically illustrates a perspective view of electrolytic capacitor 100 according to the first exemplary embodiment. FIG. 2 schematically illustrates a perspective view of anode lead terminal 120 and cathode lead terminal 130 of electrolytic capacitor 100 illustrated in FIG. 1. FIG. 3 illustrates a cross-sectional view of an anchor portion of anode lead terminal 120. FIG. 4 illustrates a cross-sectional view of an anchor portion of cathode lead terminal 130. Note that, in FIGS. 3 and 4, for easy understanding, a position of capacitor element 110 is indicated by a dotted line, and a contour of outer packaging resin 101 is indicated by a solid line. FIGS. 3 and 4 are diagrams illustrating a cross section perpendicular to direction (D1) of electrolytic capacitor 100. FIG. 5 schematically illustrates a bottom view of electrolytic capacitor 100 illustrated in FIG. 1. In FIG. 5, a part embedded in outer packaging resin 101 is indicated by a dotted line.

Figure 6:
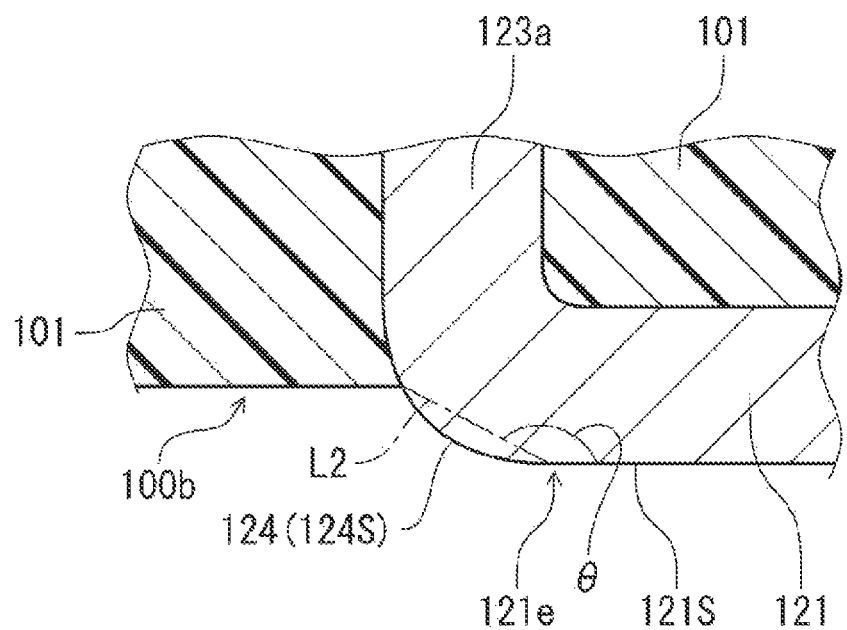
FIG. 6 is a cross-sectional view schematically illustrating a main part of the electrolytic capacitor illustrated in FIG. 1.
Figure 7:
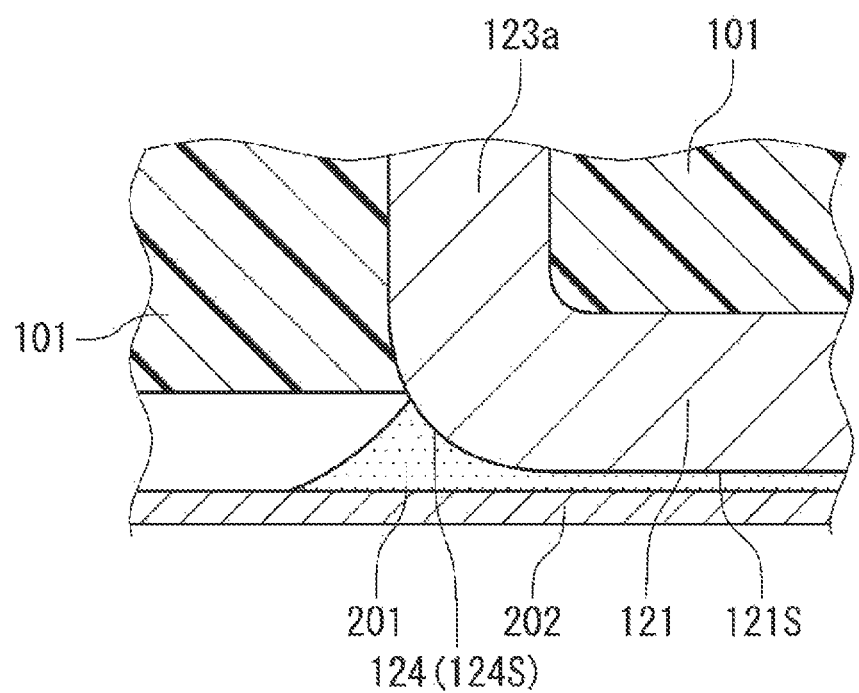
FIG. 7 is a cross-sectional view of a main part schematically illustrating a state in which an anode terminal of the electrolytic capacitor illustrated in FIG. 1 is connected to a board by soldering.
Figure 8:
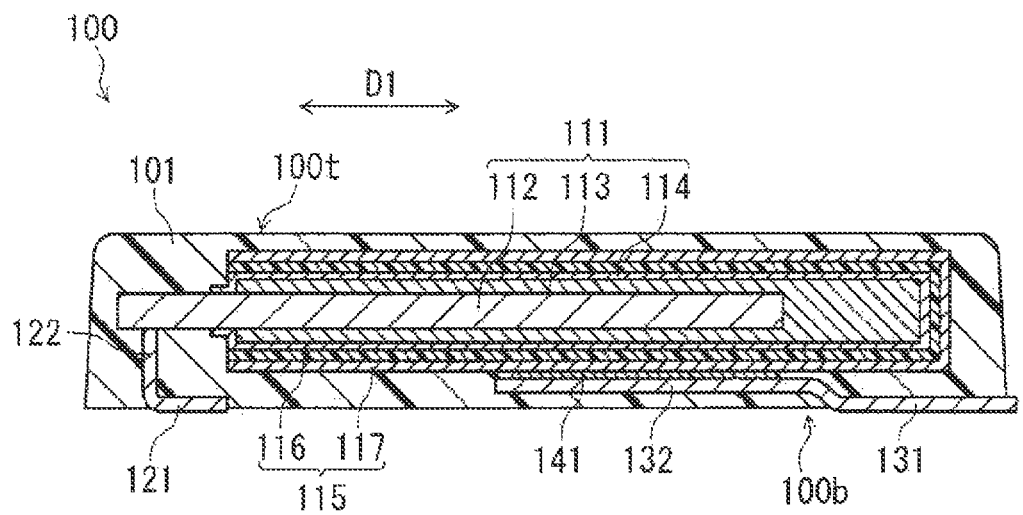
FIG. 8 is a cross-sectional view schematically illustrating the electrolytic capacitor illustrated in FIG. 1.

FIG. 6 shows a cross-sectional view of a main part of electrolytic capacitor 100 illustrated in FIG. 1, showing the vicinity of a boundary between anode terminal 121 and upright portion 123a. FIG. 7 is a cross-sectional view of a main part illustrating a state in which anode terminal 121 of electrolytic capacitor 100 illustrated in FIG. 1 is connected to board 202 by solder 201. FIGS. 6 and 7 are diagrams illustrating a cross section perpendicular to direction (D1) of electrolytic capacitor 100. Furthermore, FIG. 8 schematically illustrates a cross-sectional view of electrolytic capacitor 100 illustrated in FIG. 1. The cross-sectional view of FIG. 8 is a cross-sectional view passing through a central axis of anode lead (anode wire) 112. Note that, in order to facilitate understanding, some constituent elements may be indicated only by contours in a drawing below. For example, in FIG. 1, outer packaging resin 101 is indicated only by a contour shown by a dotted line.

Electrolytic capacitor 100 includes bottom surface 100b, and upper surface 100t opposite to bottom surface 100b. Electrolytic capacitor 100 includes capacitor element 110, anode lead terminal 120, cathode lead terminal 130, conductive member 141, and outer packaging resin 101. Anode lead terminal 120 and cathode lead terminal 130 are electrically connected to capacitor element 110.

Referring to FIGS. 2, 5, and 6, anode lead terminal 120 includes anode terminal 121, wire wire connection part 122, and two anchor portions 123. A part of anode terminal 121 in a thickness direction (for example, about ½ of thickness of anode terminal 121) is exposed from bottom surface 100b. Anode terminal 121 has principal surface 121S exposed from bottom surface 100b. Wire connection part 122 rises from anode terminal 121 toward upper surface 100t. A groove of wire connection part 122 for receiving a tip of anode lead 112 is formed by resistance welding anode lead 112 and wire connection part 122. Anode lead 112 and wire connection part 122 may be connected by welding, soldering, or the like.

Referring to FIGS. 1 and 2, each of two anchor portions 123 extends from a corresponding one of two end sides 121e. Two end sides 121e are end sides of anode terminal 121, and are a pair of end sides along direction D1 in which anode lead 112 extends.

Referring to FIGS. 1 and 3, each of two anchor portions 123 includes upright portion 123a that rises from end side 121e toward upper surface 100t, and an extension portion 123b that bends to extend from an upper end of upright portion 123a. In an example illustrated in the first exemplary embodiment, two anchor portions 123 are bent in different directions at a boundary between anode terminal 121 and upright portion 123a and a boundary between upright portion 123a and extension portion 123b. Specifically, one surface (surface on a side of upper surface 100t) of a metal sheet constituting anode lead terminal 120 is valley folded at the boundary between anode terminal 121 and upright portion 123a, and mountain folded at the boundary between upright portion 123a and extension portion 123b. As a result, extension portion 123b extends from an upper end of upright portion 123a toward the outside of electrolytic capacitor 100. That is, extension portions 123b of two anchor portions 123 are bent from upper ends of upright portions 123a, and extend away from each other in direction (D2) perpendicular to direction (D1) in which anode lead 112 extends. A direction in which extension portion 123b extends is substantially parallel to bottom surface 100b, and for example, an angle formed by both may be in a range from −20° to 20°, inclusive.

Referring to FIGS. 3, 5, and 6, each of the upright portions 123a of two anchor portions 123 has a region 124 exposed from bottom surface 100b at a boundary with the end side 121e. The region 124 has inclined surface 124S continuous with principal surface 121S, and the inclined surface 124S is inclined so as to form an obtuse angle with principal surface 121S. Referring to FIG. 7, in a case where anode terminal 121 of electrolytic capacitor 100 and board 202 are joined by solder 201, presence of region 124 having inclined surface 124S facilitates formation of a fillet at a joint by solder 201, and bonding strength is increased.

Referring to FIG. 6, inclination angle θ (θ in FIG. 6) of inclined surface 124S with respect to principal surface 121S is, for example, 135° to 175°, and may be 145° to 165°. FIG. 6 illustrates a cross section perpendicular to direction (D1) of electrolytic capacitor 100 (a cross section including anode terminal 121 and upright portion 123a). A contour of inclined surface 124S in FIG. 6 has a curved shape, and θ (inclination angle θ) in FIG. 6 is an angle formed by line segment L2 connecting both ends of a curve of the contour of inclined surface 124S and principal surface 121S. Note that, in the curve, one end is a boundary between inclined surface 124S and principal surface 121S (end side 121e), and the other end is a portion where upright portion 123a starts to be exposed from bottom surface 100b.

Cathode lead terminal 130 includes cathode terminal 131, connection part 132, and two anchor portions 133. A part of cathode terminal 131 in a thickness direction (for example, about ½ of thickness of cathode terminal 131) is exposed from bottom surface 100b. Cathode terminal 131 has principal surface 131S exposed from bottom surface 100b. Connection part 132 is disposed with a step between connection part 132 and cathode terminal 131. Connection part 132 is electrically connected to cathode part 115 (cathode layer 117) described later via conductive member 141. That is, cathode terminal 131 is electrically connected to capacitor element 110 via connection part 132 and conductive member 141. Conductive member 141 is not particularly limited, and a known conductive member may be used. For example, conductive member 141 may be formed of metal paste or the like.

Each of two anchor portions 133 extends from a corresponding one of two end sides 131e. Two end sides 131e are end sides of cathode terminal 131, and are a pair of end sides along direction D1 in which anode lead 112 extends.

Referring to FIGS. 1 and 4, each of two anchor portions 133 includes upright portion 133a that rises from end side 131e toward upper surface 100t, and extension portion 133b that bends and extends from an upper end of upright portion 133a. In an example illustrated in the first exemplary embodiment, the two anchor portions are bent in different directions at a boundary between cathode terminal 131 and upright portion 133a and a boundary between upright portion 133a and extension portion 133b. That is, extension portions 133b of two anchor portions 133 are bent from upper ends of upright portions 133a, and extend away from each other in direction (D2) perpendicular to direction (D1) in which anode lead 112 extends. A direction in which extension portion 133b extends is substantially parallel to bottom surface 100b, and for example, an angle formed by both may be in a range from −20° to 20°, inclusive.

Referring to FIGS. 4 and 5, each of upright portions 133a of two anchor portions 133 has region 134 exposed from bottom surface 100b at a boundary with end side 131e. The region 134 has inclined surface 134S continuous with principal surface 131S, and the inclined surface 134S is inclined so as to form an obtuse angle with principal surface 131S. As region 134 having inclined surface 134S is provided, the same effect as a case where region 124 having inclined surface 124S is provided can be obtained.

In a cross section perpendicular to direction (D1) of electrolytic capacitor 100 (a cross section including cathode terminal 131 and upright portion 133a), a contour of inclined surface 134S has a curved shape, and inclination angle θ of inclined surface 134S with respect to principal surface 131S is shown in a similar manner as the case of inclined surface 124S. Inclination angle θ of inclined surface 134S is, for example, 135° to 175°, and may be 145° to 165°.

Referring to FIG. 3, distance L1 from a surface of anode terminal 121 to a lower surface of extension portion 123b may be more than or equal to 50 μm (for example, more than or equal to 75 μm or more than or equal to 100 μm). By setting distance L1 to more than or equal to 50 μm (for example, more than or equal to 75 μm or more than or equal to 100 μm), a lower part of extension portion 123b can be easily filled with outer packaging resin 101. Note that, in FIG. 3, an upper surface of extension portion 123b is located below a lower surface of capacitor element 110. However, extension portion 123b may be located at a higher position as long as extension portion 123b does not interfere with capacitor element 110.

Referring to FIG. 4, distance L3 from a surface of cathode terminal 131 to a lower surface of extension portion 133b may be more than or equal to 50 μm (for example, more than or equal to 75 μm or more than or equal to 100 μm), or may be in a range from 50 μm to 500 μm, inclusive (for example, a range from 75 μm to 200 μm, inclusive). Distance L4 from an upper surface of extension portion 133b to a lower surface of capacitor element 110 may be more than or equal to 50 μm (for example, more than or equal to 75 μm or more than or equal to 100 μm), or may be in a range from 50 μm to 500 μm, inclusive (for example, a range from 75 μm to 200 μm, inclusive). By setting distance L1 and distance L3 to more than or equal to 50 μm (for example, more than or equal to 75 μm or more than or equal to 100 μm), it becomes easy to fill a lower part and an upper part of extension portion 133b with outer packaging resin 101.

Horizontal distance W1 (distance along direction D2) from end side 121e to a tip of extension portion 123b and horizontal distance W2 (distance along direction D2) from end side 131e to a tip of extension portion 133b may be more than or equal to 50 μm (for example, more than or equal to 75 μm or more than or equal to 100 μm). By setting horizontal distance W1 within this range, a high anchor effect can be obtained. Further, from the viewpoint of shape stability, processability, and the like, horizontal distances W1 and W2 may be 200 μm or more.

Note that a shape of anode lead terminal 120 and cathode lead terminal 130 described above is merely an example, and is not limited to the above shape. For example, either anode lead terminal 120 or cathode lead terminal 130 does not need to include the anchor portions. Further, as long as the connection part of cathode lead terminal 130 is electrically connected to cathode part 115 (cathode layer 117), the connection part does not need to be at a position illustrated in the diagram, and does not need to have the shape illustrated in the diagram.

Figure 9:
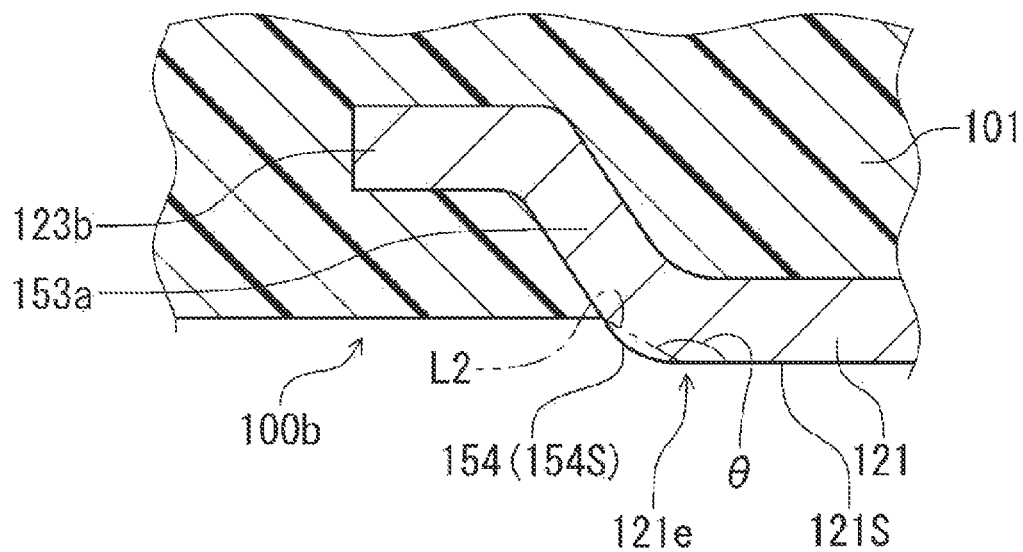
FIG. 9 is a cross-sectional view schematically illustrating a main part of a configuration of another example of the electrolytic capacitor of the first embodiment.

Upright portion 123a rises substantially perpendicularly (for example, more than 80° and less than 100°) to anode terminal 121, but may be upright portion 153a inclined so as to form an obtuse angle with anode terminal 121 as illustrated in FIG. 9. Upright portion 153a may rise while being inclined at an obtuse angle of, for example, 100° to 150° with respect to anode terminal 121. By changing degree of inclination of upright portion 153a with respect to anode terminal 121, degree of inclination of inclined surface 154S in region 154 of upright portion 153a exposed from bottom surface 100b at a boundary with end side 121e may be adjusted. That is, inclination angle θ (in FIG. 9, angle θ formed by line segment L2 connecting both ends of a curve of a contour of inclined surface 154S and principal surface 121S) of inclined surface 154S with respect to principal surface 121S may be adjusted. Similarly, an upright portion of the cathode lead terminal may be inclined so as to form an obtuse angle with the cathode terminal.

Referring to FIG. 8, capacitor element 110 includes anode part 111 and cathode part 115. Anode part 111 includes anode body 113 having dielectric layer 114 formed on its surface, and anode lead 112. Cathode part 115 includes electrolyte layer 116 disposed so as to cover dielectric layer 114, and cathode layer 117. Cathode layer 117 includes, for example, a carbon layer formed on electrolyte layer 116, and a metal particle layer formed on the carbon layer. The metal particle layer is, for example, a layer formed using metal paste.

As described above, anode part 111 of capacitor element 110 is electrically connected to anode lead terminal 120, and cathode part 115 of capacitor element 110 is electrically connected to cathode lead terminal 130. In a case where electrolytic capacitor 100 is mounted on a substrate or the like of an electronic device, electrolytic capacitor 100 may be mounted by soldering anode terminal 121 and cathode terminal 131 to each other.

An example of a method of manufacturing electrolytic capacitor 100 will be described below. First, capacitor element 110, anode lead terminal 120, and cathode lead terminal 130 are prepared. A method of manufacturing capacitor element 110 is not particularly limited, and the capacitor element can be manufactured by a known method. Anode lead terminal 120 and cathode lead terminal 130 can be formed by a known metal processing method.

Next, anode lead 112 and anode lead terminal 120 are connected, and cathode layer 117 and cathode lead terminal 130 are connected. Anode lead 112 and anode lead terminal 120 can be connected by welding (for example, laser welding) or the like. Cathode layer 117 and cathode lead terminal 130 can be connected by, for example, a method below. First, metal paste to be conductive member 141 is applied to a surface of connection part 132 of cathode lead terminal 130 and/or a surface of cathode layer 117. Next, cathode layer 117 and connection part 132 are bonded to each other with metal paste interposed between them, and the metal paste becomes conductive member 141 by being cured. In this way, cathode layer 117 and cathode lead terminal 130 can be connected to each other.

Next, the capacitor element is sealed with a material (for example, mold resin) of outer packaging resin 101. A sealing step can be performed by a known method. In this way, electrolytic capacitor 100 can be manufactured. Note that other electrolytic capacitors of the present disclosure can also be manufactured by the same manufacturing method.

Second Exemplary Embodiment

Hereinafter, a second exemplary embodiment of the present disclosure will be described with reference to an example, but the present disclosure is not limited to the example to be described below. In description below, specific numerical values and materials may be provided as examples, but other numerical values and materials may be applied as long as the effect of the present disclosure can be obtained. Note that constituent elements of known electrolytic capacitors may be applied to constituent elements other than parts that are characteristics of the present disclosure.

Electrolytic Capacitor

An electrolytic capacitor of the present disclosure includes a bottom surface, and an upper surface opposite to the bottom surface. Hereinafter, the bottom surface and the upper surface may be referred to as "bottom surface (B)" and "upper surface (T)". An electrolytic capacitor of the present disclosure includes a capacitor element including an anode lead, an anode lead terminal and a cathode lead terminal each electrically connected to the capacitor element, and outer packaging resin disposed around the capacitor element. Hereinafter, a direction in which the anode lead extends ( a longitudinal direction of the anode lead) may be referred to as "direction (D1)". A direction perpendicular to a direction in which the anode lead extends may be referred to as "direction (D2)".

The anode lead terminal is made from a metal sheet. The anode lead terminal includes an anode terminal having a first principal surface and a second principal surface on a side (back side) opposite to the first principal surface, and an anode connection part electrically connected to a tip of the anode lead. The first principal surface is exposed from bottom surface (B). From the viewpoint of solder fillet formation, a part of the anode terminal in a thickness direction may be exposed from bottom surface (B).

The anode terminal has a first region at the center and a second A region and a second B region on both sides of the first region. The anode connection part is disposed so as to rise from the first region toward upper surface (T). Each of the second A region and the second B region includes a protrusion extending from the first region and having a tip protruding from an end of bottom surface (B). The protrusion in the second A region and the protrusion in the second B region usually extend from the first region in direction (D1). From the viewpoint of formation of a solder fillet, the anode terminal is disposed such that a tip of the protrusion slightly protrudes from an end of bottom surface (B) when the electrolytic capacitor is viewed from bottom surface (B) side. The second principal surface is exposed at a tip of the protrusion, and is in contact with the outer packaging resin in a region other than the tip of the protrusion.

Each of the protrusion in the second A region and the protrusion in the second B region has a side surface continuous with the first principal surface and the second principal surface. Hereinafter, the side surface is referred to as "side surface (S)". Side surface (S) of the protrusion in the second A region and side surface (S) of the protrusion in the second B region face each other, and are inclined in directions different from each other with respect to the first principal surface and the second principal surface. That is, two side surfaces (S) are inclined in different directions from each other from the first principal surface to the second principal surface. In the case where two side surfaces (S) are inclined as described above, when stress is applied to the anode lead terminal in steps (step of separation for each capacitor element, step of cutting the anode lead terminal, and the like) or the like after formation of the outer packaging resin, a resin burr remaining between tips of two of the protrusions (side surfaces (S)) easily falls off. Therefore, remaining of a resin burr and a mounting failure of the electrolytic capacitor associated with the remaining of a resin burr are prevented.

Each of side surface (S) of the protrusion in the second A region and side surface (S) of the protrusion in second B region is preferably inclined so as to form an obtuse angle with the first principal surface. In this case, side surface (S) is inclined so as to form an acute angle with the second principal surface. In this case, an excellent solder fillet is easily formed, and connection strength between the anode terminal and the board is increased. In this case, an inclination angle of side surface (S) with respect to the first principal surface may range from 100° to 135°, inclusive, and may range from 110° to 135°, inclusive. In a case where the inclination angle is within the above range, an effect of preventing a mounting failure and an effect of improving connection strength are easily obtained.

The inclination angle of side surface (S) with respect to the first principal surface is an angle formed by the first principal surface and side surface (S) when the electrolytic capacitor (anode terminal side) is viewed from direction (D1). When the electrolytic capacitor (anode terminal side) is viewed from direction (D1), a contour of side surface (S) may be linear or have a curved shape with a slightly bulged arc. In a case where the contour of side surface (S) has a curved shape, the inclination angle refers to an angle formed by a line segment (chord) connecting both ends of a curve (arc) and the first principal surface.

Side surface (S) of the protrusion in each of the second A region and the second B region may be inclined so as to form an acute angle with the first principal surface. In this case, side surface (S) is inclined so as to form an obtuse angle with the second principal surface. In this case, it is easy to secure a large joint area between the anode terminal and the board. From the viewpoint of securing a joint area between the anode terminal and the board and preventing a mounting failure, the inclination angle of side surface (S) with respect to the first principal surface may range from 45° to 80°, inclusive, or may range from 45° to 70°, inclusive.

The second A region and the second B region (excluding the protrusion) are usually symmetrical with respect to a plane perpendicular to bottom surface (B) and passing through a central axis of the anode lead, but do not need to be symmetrical. The protrusions of the second A region and the second B region are usually symmetrical with respect to a plane perpendicular to bottom surface (B) and passing through the central axis of the anode lead.

At least one of the anode lead terminal or the cathode lead terminal may include a terminal portion having a principal surface exposed from bottom surface (B) and two anchor portions each extending from the terminal portion (in the case of the anode terminal, the second A region and the second B region) and embedded in the outer packaging resin. Hereinafter, the lead terminal including the two anchor portions may be referred to as "lead terminal (L)". The terminal portion (in the case of the anode terminal, the second A region and the second B region) may have two end sides along the direction D1 in which the anode lead extends. Each of the two anchor portions may include an upright portion that rises from an end side of the terminal portion (in the case of the anode terminal, the second A region and the second B region) toward the upper surface (T) and an extension portion that bends and extends from an upper end of the upright portion.

As described above, the anchor portion (the upright portion and the extension portion) is embedded in the outer packaging resin. Furthermore, a metal sheet constituting lead terminal (L) is bent at two points of a boundary between the terminal portion and the upright portion and a boundary between the upright portion and the extension portion. According to this configuration, a direction in which the upright portion extends is different from a direction in which the extension portion extends. Accordingly, the anchor portion exhibits a high anchor effect. Therefore, lead terminal (L) (terminal portion) is prevented from being separated from the outer packaging resin, and terminal strength is increased.

Size of the anchor portion is not particularly limited as long as the anchor effect can be obtained. An example of size of the anchor portion will be described below.

The two anchor portions included in one lead terminal (L) are usually symmetrical with respect to a plane perpendicular to bottom surface (B) and passing through a central axis of the anode lead, but do not need to be symmetrical. In a case where each of the anode lead terminal and the cathode lead terminal includes the anchor portion, a shape of the anchor portion of the anode lead terminal and a shape of the anchor portion of the cathode lead terminal may be the same or different.

In the electrolytic capacitor of the present disclosure, an entire surface of the extension portion is in contact with the outer packaging resin. From another point of view, in the electrolytic capacitor of the present disclosure, the anchor portion is preferably not in contact with the capacitor element. According to these configurations, a high anchor effect can be obtained.

The two anchor portions may be bent in different directions (reverse rotation directions) at the boundary between the terminal portion and the upright portion and the boundary between the upright portion and the extension portion. Here, bent in different directions means that a metal sheet constituting lead terminal (L) is bent such that one surface (surface on a side of upper surface (T)) of the metal sheet is a valley at the boundary between the terminal portion and the upright portion, and is bent such that the one surface is a mountain at the boundary between the upright portion and the extension portion. More specifically, the extension portions of the two anchor portions may be bent from the upper end of the upright portion and extend away from each other. That is, the extension portions of the two anchor portions may be bent from the upper end of the upright portion and extend away from each other in direction (D2) perpendicular to direction (D1) in which the anode lead extends. The anchor portion having this configuration is easily formed. Further, in a case where the anchor portion having this configuration is used, it is easy to perform filling with a material (mold resin or the like) of the outer packaging resin. Note that the two anchor portions may be bent in the same direction (the same rotation direction) at the boundary between the terminal portion and the upright portion and the boundary between the upright portion and the extension portion.

In the electrolytic capacitor of the present disclosure, each of the anode lead terminal and the cathode lead terminal may include two anchor portions. According to this configuration, an electrolytic capacitor having particularly high terminal strength and reliability can be obtained. Alternatively, only the anode lead terminal may include the two anchor portions, or only the cathode lead terminal may include the two anchor portions.

Hereinafter, an example of constituent elements of the electrolytic capacitor of the present disclosure will be described.

Anode Lead Terminal

The anode lead terminal may be formed by processing one metal sheet by a known metal processing method. A material of the anode lead terminal may be any material that can be used as the material of the anode lead terminal of the electrolytic capacitor. For example, a material of a known anode lead terminal used for the electrolytic capacitor may be used. The anode lead terminal may be formed by processing a metal sheet (including a metal plate and a metal foil) made from metal (copper, copper alloy, and the like). A surface of the metal sheet may be subjected to plating such as nickel plating or gold plating. A thickness of the metal sheet constituting the anode lead terminal may be in a range from 25 μm to 200 μm, inclusive (for example, in a range from 25 μm to 100 μm, inclusive).

The anode lead terminal may include an anode terminal exposed from bottom surface (B), and a wire connection part (anode connection part) rising from the anode terminal toward upper surface (T). As described above, two anchor portions may extend from the anode terminal (the second A region and the second B region). The anode lead of the capacitor element is connected to the wire connection part. The wire connection part may include a wire reception part bent at its tip so as to be substantially parallel to bottom surface (B). The wire reception part may be bent toward a front surface of the capacitor element or may be bent in an opposite direction. Here, the front surface of the capacitor element is a surface facing an end surface of the capacitor element from which a wire protrudes. The wire reception pan enables reliable and easy connection between the wire connection part and the anode lead.

Cathode Lead Terminal

The cathode lead terminal may be formed by processing one metal sheet by a known metal processing method. A material of the cathode lead terminal may be any material that can be used as a material of the cathode lead terminal of the electrolytic capacitor. For example, a known cathode lead terminal material used in an electrolytic capacitor may be used. The cathode lead terminal may be formed of the metal sheet exemplified as the material of the anode lead terminal.

The cathode lead terminal may include a cathode terminal exposed from bottom surface (B), and a connection part electrically connected to a cathode part of the capacitor element. The cathode part of the capacitor element is electrically connected to the cathode terminal via the connection part. As described above, the two anchor portions may extend from the cathode terminal.

Capacitor Element

The capacitor element is not particularly limited. As the capacitor element, a capacitor element used in a known solid electrolytic capacitor or a capacitor element having a similar configuration may be used. Note that the electrolytic capacitor of the present disclosure may include a plurality of the capacitor elements. In this case, anode parts of a plurality of capacitors are electrically connected to the anode lead terminal.

An example of the capacitor element includes an anode part and a cathode part. The anode part includes an anode body having a dielectric layer formed on its surface and an anode lead, and the cathode part includes an electrolyte layer and a cathode layer. The electrolyte layer is disposed between the dielectric layer formed on a surface of the anode body and the cathode layer. These constituent elements are not particularly limited, and constituent elements used for known solid electrolytic capacitors may be applied. Examples of these constituent elements are similar to the example described in the first embodiment, and thus, are omitted from description.

Outer Packaging Resin

The outer packaging resin is disposed around the capacitor element so that the capacitor element is not exposed from a surface of the electrolytic capacitor. Furthermore, the outer packaging resin insulates the anode lead terminal from the cathode lead terminal. Known outer packaging resin used for an electrolytic capacitor may be applied to the outer packaging resin. For example, the outer packaging resin may be formed using an insulating resin material used for sealing the capacitor element. Examples of a material of the outer packaging resin include epoxy resin, phenol resin, silicone resin, melamine resin, urea resin, alkyd resin, polyurethane, polyimide, unsaturated polyester, and the like. The outer packaging resin may contain a substance (such as an inorganic filler) other than the resin.

Hereinafter, an example of the electrolytic capacitor of the second exemplary embodiment of the present disclosure will be specifically described with reference to the drawings. The above-described constituent elements can be applied to constituent elements of an electrolytic capacitor as an example described below. Further, constituent elements of an electrolytic capacitor as an example described below can be changed based on the above description. Further, a matter described below may be applied to the exemplary embodiment described above. Further, in the exemplary embodiment described below, constituent elements that are not essential to the electrolytic capacitor of the present disclosure may be omitted. Note that, a diagram below, the same reference numerals are given to the same configurations as those of the example of the electrolytic capacitor of the first exemplary embodiment.

Figure 10:
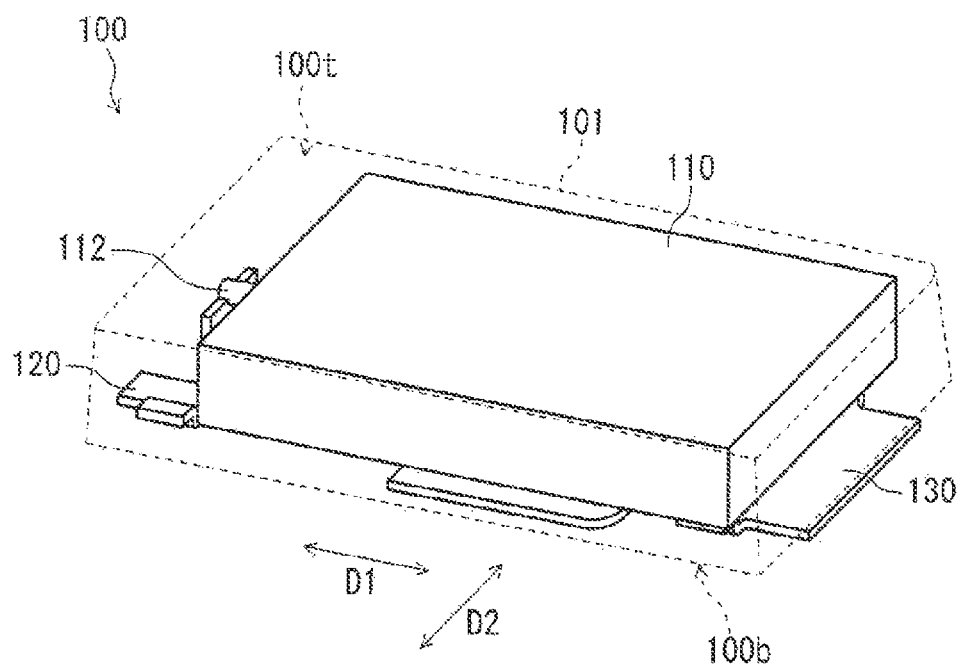
FIG. 10 is a perspective view schematically illustrating an example of the electrolytic capacitor of a second embodiment.
Figure 11:
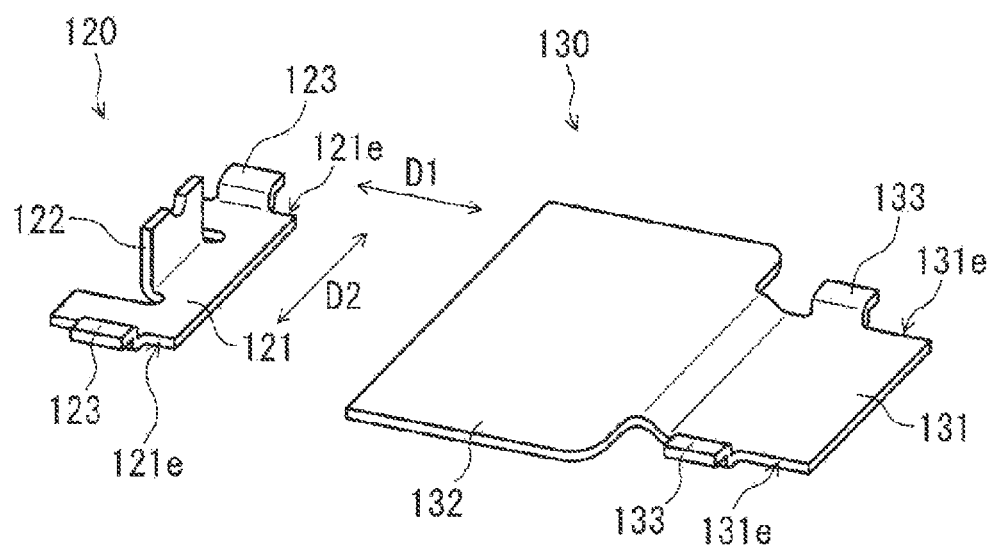
FIG. 11 is a perspective view schematically illustrating a member of a part of the electrolytic capacitor illustrated in FIG. 10.
Figure 12:
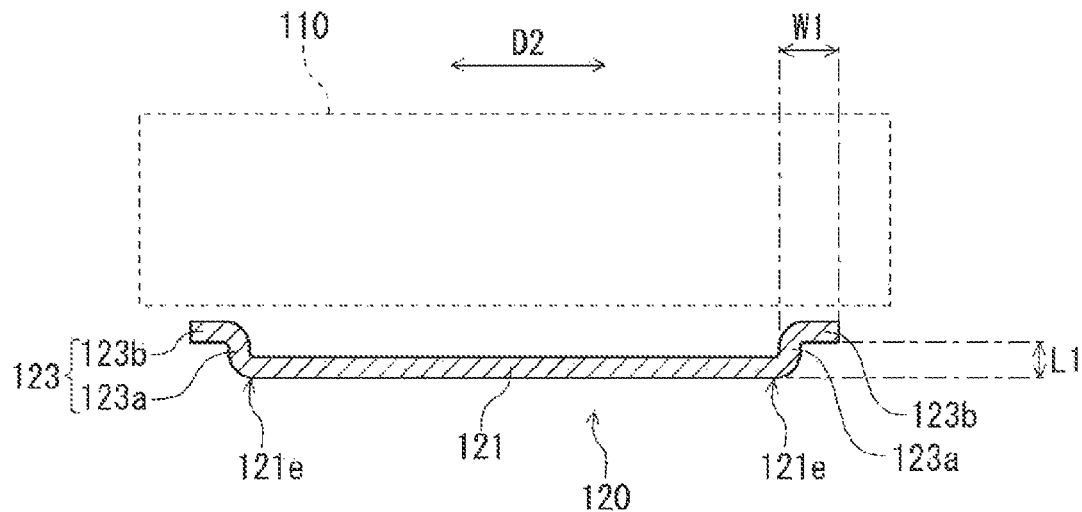
FIG. 12 is a cross-sectional view schematically illustrating the anode lead terminal of the electrolytic capacitor illustrated in FIG. 10.
Figure 13:
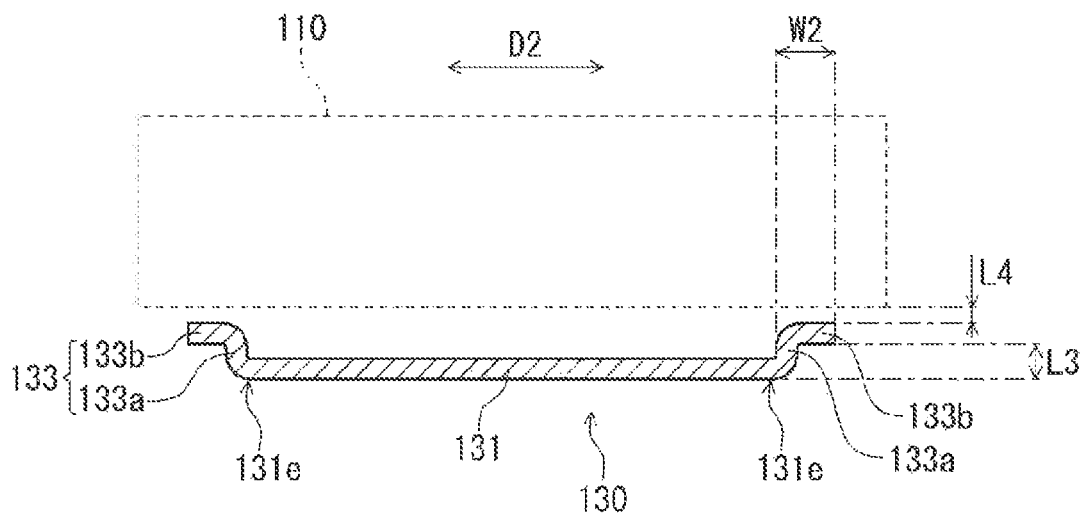
FIG. 13 is a cross-sectional view schematically illustrating a cathode lead terminal of the electrolytic capacitor illustrated in FIG. 10.
Figure 14:
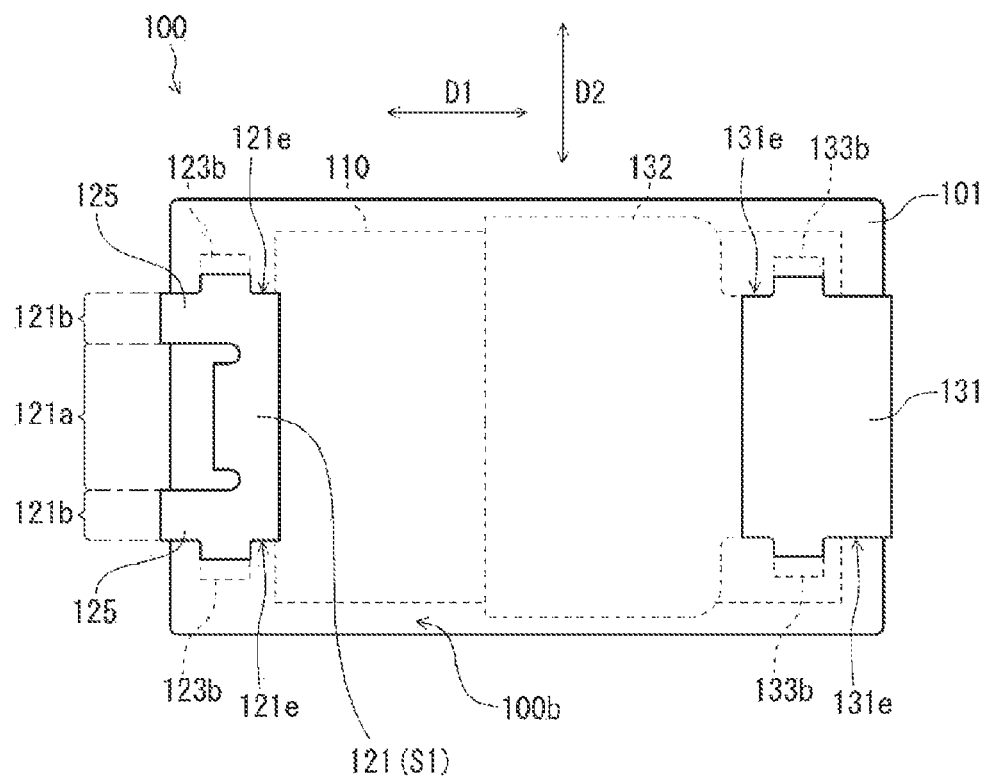
FIG. 14 is a bottom view schematically illustrating the electrolytic capacitor illustrated in FIG. 10.
Figure 15:
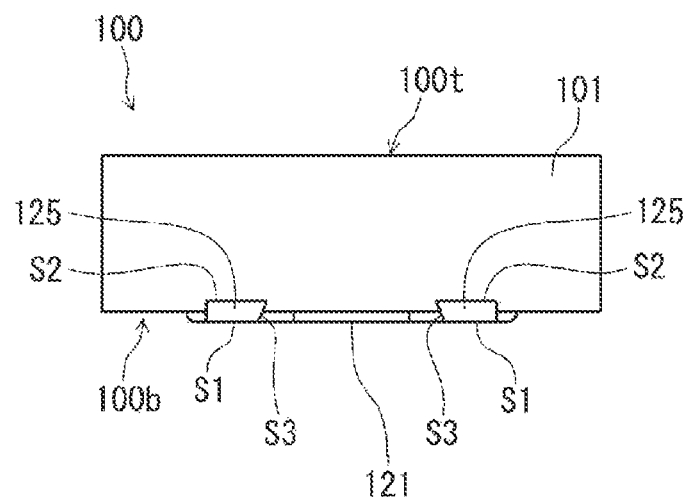
FIG. 15 is a side view schematically illustrating the electrolytic capacitor when the electrolytic capacitor (anode terminal side) illustrated in FIG. 10 is viewed from direction (D1).
Figure 16:
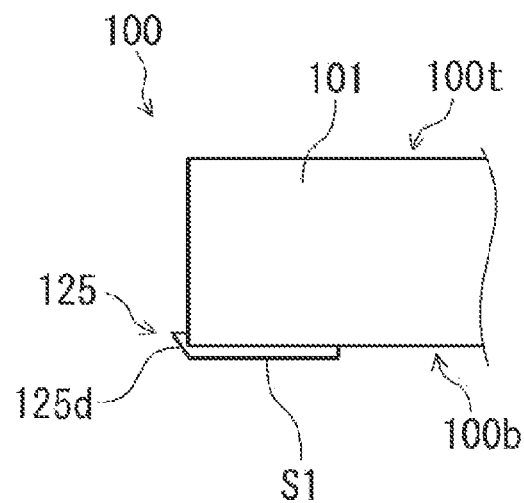
FIG. 16 is a side view of a main part schematically illustrating the electrolytic capacitor when the electrolytic capacitor (anode terminal side) illustrated in FIG. 10 is viewed from direction (D2).
Figure 17:
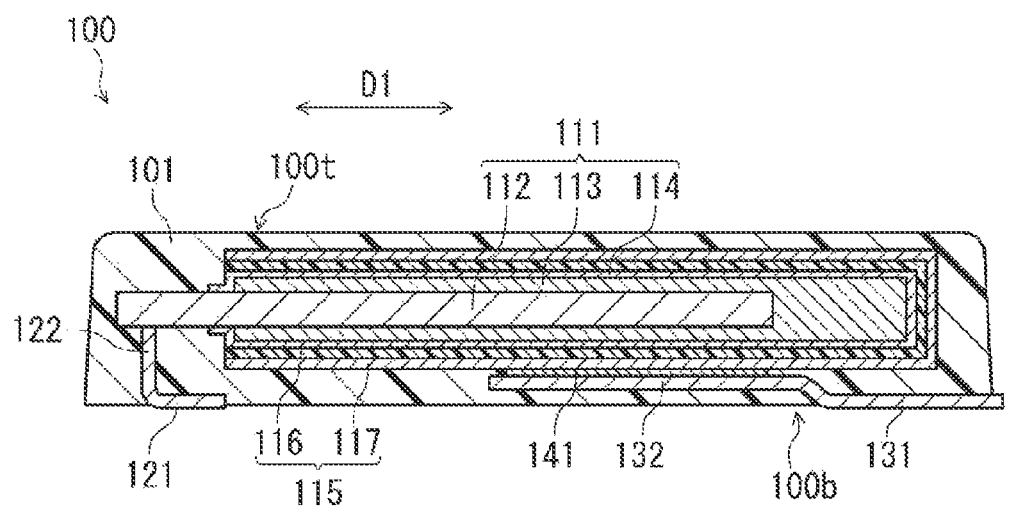
FIG. 17 is a cross-sectional view schematically illustrating the electrolytic capacitor illustrated in FIG. 10.

FIG. 10 schematically illustrates a perspective view of electrolytic capacitor 100 according to the second exemplary embodiment. FIG. 11 schematically illustrates a perspective view of anode lead terminal 120 and cathode lead terminal 130 of electrolytic capacitor 100 illustrated in FIG. 10. FIG. 12 illustrates a cross-sectional view of an anchor portion of anode lead terminal 120. FIG. 13 illustrates a cross-sectional view of an anchor portion of cathode lead terminal 130. Note that, in FIGS. 12 and 13, a position of capacitor element 110 is indicated by a dotted line. FIG. 14 schematically illustrates a bottom view of electrolytic capacitor 100 illustrated in FIG. 10. In FIG. 14, a part embedded in outer packaging resin 101 is indicated by a dotted line. FIG. 15 illustrates a side view schematically illustrating the electrolytic capacitor when the electrolytic capacitor (anode terminal side) illustrated in FIG. 10 is viewed from direction (D1). FIG. 16 illustrates a side view of a main part schematically illustrating the electrolytic capacitor when the electrolytic capacitor (anode terminal side) illustrated in FIG. 10 is viewed from direction (D2). Further, FIG. 17 schematically illustrates a cross-sectional view of electrolytic capacitor 100 illustrated in FIG. 10. The cross-sectional view of FIG. 17 is a cross-sectional view passing through a central axis of anode lead (anode wire) 112. Note that, in order to facilitate understanding, some constituent elements may be indicated only by contours in a drawing below. For example, in FIG. 10, outer packaging resin 101 is indicated only by a contour indicated by a dotted line.

Electrolytic capacitor 100 includes bottom surface 100b, and upper surface 100t opposite to bottom surface 100b. Electrolytic capacitor 100 includes capacitor element 110, anode lead terminal 120, cathode lead terminal 130, conductive member 141, and outer packaging resin 101. Anode lead terminal 120 and cathode lead terminal 130 are electrically connected to capacitor element 110.

Referring to FIGS. 11, 14, and 15, anode lead terminal 120 is made from a metal sheet, and includes anode terminal 121, wire connection part 122, and two anchor portions 123. Anode terminal 121 has first principal surface S1 and second principal surface S2 on an opposite side to first principal surface S1, and first principal surface S1 is exposed from bottom surface 100b. A part of anode terminal 121 in a thickness direction is exposed from bottom surface 100b. Wire connection part 122 rises from anode terminal 121 toward upper surface 100t. A groove of wire connection part 122 for receiving a tip of anode lead 112 is formed by resistance welding anode lead 112 and wire connection part 122. Anode lead 112 and wire connection part 122 may be connected by welding, soldering, or the like.

Referring to FIG. 14, anode terminal 121 has first region 121a at the center and two second regions 121b (second A region and second B region) on both sides of first region 121a. In direction (D1) in which anode lead 112 extends, each of two second regions 121b includes protrusion 125 extending from first region 121a and having a tip protruding from an end of bottom surface 100b. Referring to FIG. 15, each of protrusions 125 of two second regions 121b has side surface S3 continuous with first principal surface S1 and second principal surface S2. Side surfaces S3 of protrusions 125 of two second regions 121b face each other, and are inclined in directions different from each other with respect to first principal surface S1 and second principal surface S2. That is, side surfaces S3 of two protrusions 125 are inclined in different directions from each other from first principal surface S1 to second principal surface S2.

Referring to FIG. 15, side surfaces S3 of protrusions 125 of two second regions 121b are each inclined so as to form an obtuse angle with first principal surface S1. In this case, side surface S3 is inclined so as to form an acute angle with second principal surface S2. An inclination angle of side surface S3 with respect to first principal surface S1 may range from 100° to 135°, inclusive, and may range from 110° to 135°, inclusive. The inclination angle is an angle formed by principal surface S1 and side surface S3 when the electrolytic capacitor (anode terminal side) is viewed from direction (D1). Although a contour of side surface S3 of protrusion 125 illustrated in FIG. 15 is linear, the contour may have a curved shape with a slightly bulged arc.

As illustrated in FIG. 16, a tip surface 125d of two protrusions 125 may also be inclined so as to form an obtuse angle with first principal surface S1. In this case, an excellent solder fillet is easily formed, and connection strength between the anode terminal and the board is increased. An inclination angle of tip surface 125d with respect to first principal surface S1 may range from 100° to 135°, inclusive, or may range from 110° to 135°, inclusive.

Referring to FIGS. 10 and 11, each of two anchor portions 123 extends from a corresponding one of two end sides 121e. Two end sides 121e are end sides of anode terminal 121 (two second regions 121b), and are a pair of end sides along direction D1 in which anode lead 112 extends.

Referring to FIGS. 10 and 12, each of two anchor portions 123 includes upright portion 123a that rises from end side 121e toward upper surface 100t, and extension portion 123b that bends and extends from an upper end of upright portion 123a. In an example illustrated in the second exemplary embodiment, two anchor portions 123 are bent in different directions at a boundary between anode terminal 121 and upright portion 123a and a boundary between upright portion 123a and extension portion 123b. Specifically, one surface (surface on a side of upper surface 100t) of a metal sheet constituting anode lead terminal 120 is valley folded at the boundary between anode terminal 121 and upright portion 123a, and mountain folded at the boundary between upright portion 123a and extension portion 123b. As a result, extension portion 123b extends from an upper end of upright portion 123a toward the outside of electrolytic capacitor 100. That is, extension portions 123b of two anchor portions 123 are bent from upper ends of upright portions 123a, and extend away from each other in direction (D2) perpendicular to direction (D1) in which anode lead 112 extends. A direction in which extension portion 123b extends is substantially parallel to bottom surface 100b, and for example, an angle formed by both may be in a range from −20° to 20°, inclusive.

Cathode lead terminal 130 includes cathode terminal 131, connection part 132, and two anchor portions 133. Cathode terminal 131 is exposed from bottom surface 100b. Connection part 132 is disposed with a step between connection part 132 and cathode terminal 131. Connection part 132 is electrically connected to cathode part 115 (cathode layer 117) described later via conductive member 141. That is, cathode terminal 131 is electrically connected to capacitor element 110 via connection part 132 and conductive member 141. Conductive member 141 is not particularly limited, and a known conductive member may be used. For example, conductive member 141 may be formed of metal paste or the like.

Each of two anchor portions 133 extends from a corresponding one of two end sides 131e. Two end sides 131e are end sides of cathode terminal 131, and are a pair of end sides along direction D1 in which anode lead 112 extends.

Referring to FIGS. 10 and 13, each of two anchor portions 133 includes upright portion 133a that rises from end side 131e toward upper surface 100t, and extension portion 133b that bends and extends from an upper end of upright portion 133a. In an example illustrated in the second exemplary embodiment, the two anchor portions are bent in different directions at a boundary between cathode terminal 131 and upright portion 133a and a boundary between upright portion 133a and extension portion 133b. That is, extension portions 133b of two anchor portions 133 are bent from upper ends of upright portions 133a, and extend away from each other in direction (D2) perpendicular to direction (D1) in which anode lead 112 extends. A direction in which extension portion 133b extends is substantially parallel to bottom surface 100b, and for example, an angle formed by both may be in a range from −20° to 20°, inclusive.

Referring to FIG. 12, distance L1 from a surface of anode terminal 121 to a lower surface of extension portion 123b may be more than or equal to 50 μm (for example, more than or equal to 75 μm or more than or equal to 100 μm). By setting distance L1 to more than or equal to 50 μm (for example, more than or equal to 75 μm or more than or equal to 100 μm), a lower part of extension portion 123b can be easily filled with outer packaging resin 101. Note that, in FIG. 12, an upper surface of extension portion 123b is located below a lower surface of capacitor element 110. However, extension portion 123b may be located at a higher position as long as extension portion 123b does not interfere with capacitor element 110.

Referring to FIG. 13, distance L3 from a surface of cathode terminal 131 to a lower surface of extension portion 133b may be more than or equal to 50 μm (for example, more than or equal to 75 μm or more than or equal to 100 μm), or may be in a range from 50 μm to 500 μm, inclusive (for example, a range from 75 μm to 200 μm, inclusive). Distance L4 from an upper surface of extension portion 133b to a lower surface of capacitor element 110 may be more than or equal to 50 μm (for example, more than or equal to 75 μm or more than or equal to 100 μm), or may be in a range from 50 μm to 500 μm, inclusive (for example, a range from 75 μm to 200 μm, inclusive). By setting distance L1 and distance L3 to more than or equal to 50 μm (for example, more than or equal to 75 μm or more than or equal to 100 μm), it becomes easy to fill a lower part and an upper part of extension portion 133b with outer packaging resin 101.

Horizontal distance W1 (distance along direction D2) from end side 121e to a tip of extension portion 123b and horizontal distance W2 (distance along direction D2) from end side 131e to a tip of extension portion 133b may be more than or equal to 50 μm (for example, more than or equal to 75 μm or more than or equal to 100 μm). By setting horizontal distance W1 within this range, a high anchor effect can be obtained. Further, from the viewpoint of shape stability, processability, and the like, horizontal distances W1 and W2 may be 200 μm or more.

Note that a shape of anode lead terminal 120 and cathode lead terminal 130 described above is merely an example, and is not limited to the above shape. For example, either anode lead terminal 120 or cathode lead terminal 130 does not need to include the anchor portions. Further, as long as the connection part of cathode lead terminal 130 is electrically connected to cathode part 115 (cathode layer 117), the connection part does not need to be at a position illustrated in the diagram, and does not need to have the shape illustrated in the diagram.

Figure 18:
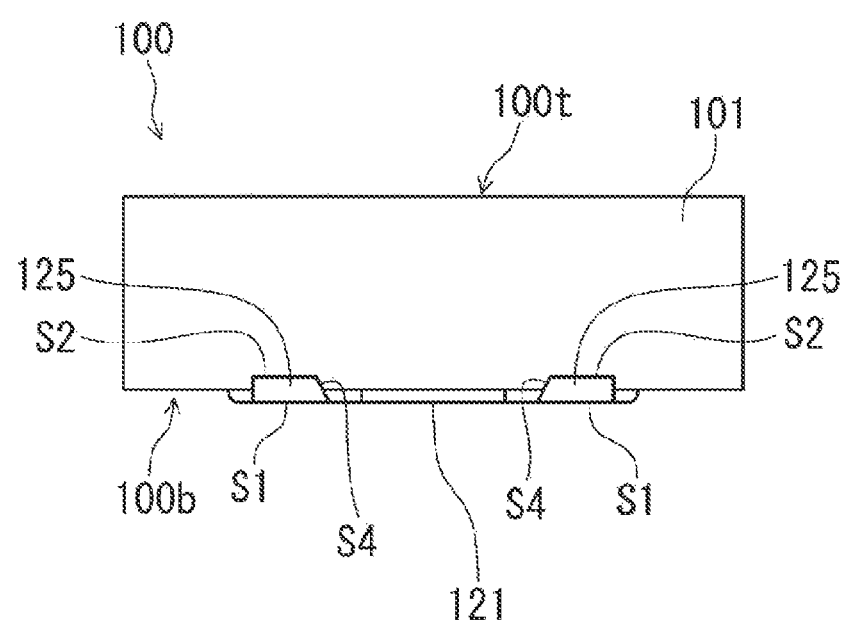
FIG. 18 is a side view schematically illustrating another example of the electrolytic capacitor of the second embodiment.

Referring to FIG. 18, each of two protrusions 125 may have side surface S4 inclined so as to form an acute angle with first principal surface S1 instead of side surface S3. In this case, side surface S4 is inclined so as to form an obtuse angle with second principal surface S2. In this case, an inclination angle of side surface S4 with respect to first principal surface S1 may range from 45° to 80°, inclusive, and may range from 45° to 70°, inclusive. Although a contour of side surface S4 illustrated in FIG. 18 is linear, the contour may have a curved shape with a slightly bulged arc.

Referring to FIG. 17, capacitor element 110 includes anode part 111 and cathode part 115. Anode part 111 includes anode body 113 having dielectric layer 114 formed on its surface, and anode lead 112. Cathode part 115 includes electrolyte layer 116 disposed so as to cover dielectric layer 114, and cathode layer 117. Cathode layer 117 includes, for example, a carbon layer formed on electrolyte layer 116, and a metal particle layer formed on the carbon layer. The metal particle layer is, for example, a layer formed using metal paste.

As described above, anode part 111 of capacitor element 110 is electrically connected to anode lead terminal 120, and cathode part 115 of capacitor element 110 is electrically connected to cathode lead terminal 130. In a case where electrolytic capacitor 100 is mounted on a substrate or the like of an electronic device, electrolytic capacitor 100 may be mounted by soldering anode terminal 121 and cathode terminal 131 to each other.

An example of a method of manufacturing electrolytic capacitor 100 will be described below. First, capacitor element 110, anode lead terminal 120, and cathode lead terminal 130 are prepared. A method of manufacturing capacitor element 110 is not particularly limited, and the capacitor element can be manufactured by a known method. Anode lead terminal 120 and cathode lead terminal 130 can be formed by a known metal processing method.

Next, anode lead 112 and anode lead terminal 120 are connected, and cathode layer 117 and cathode lead terminal 130 are connected. Anode lead 112 and anode lead terminal 120 can be connected by welding (for example, laser welding) or the like. Cathode layer 117 and cathode lead terminal 130 can be connected by, for example, a method below. First, metal paste to be conductive member 141 is applied to a surface of connection part 132 of cathode lead terminal 130 and/or a surface of cathode layer 117. Next, cathode layer 117 and connection part 132 are bonded to each other with metal paste interposed between them, and the metal paste becomes conductive member 141 by being cured. In this way, cathode layer 117 and cathode lead terminal 130 can be connected to each other.

Next, the capacitor element is sealed with a material (for example, mold resin) of outer packaging resin 101. A sealing step can be performed by a known method. In this way, electrolytic capacitor 100 can be manufactured. Note that other electrolytic capacitors of the present disclosure can also be manufactured by the same manufacturing method.

INDUSTRIAL APPLICABILITY

The present disclosure can be used for an electrolytic capacitor requiring high reliability.

The invention claimed is:

1. An electrolytic capacitor having a bottom surface and an upper surface opposite to the bottom surface, the electrolytic capacitor comprising:
a capacitor element including an anode lead;
an anode lead terminal and a cathode lead terminal each electrically connected to the capacitor element; and
outer packaging resin disposed around the capacitor element, wherein:

at least one of the anode lead terminal or the cathode lead terminal is constituted by a metal sheet and includes a terminal portion and two anchor portions, the terminal portion being partially exposed from the bottom surface, the two anchor portions each extending from the terminal portion toward an inside of the outer packaging resin, the terminal portion has a principal surface and an end side, the principal surface being exposed from the bottom surface, the end side being along a longitudinal direction of the anode lead, each of the two anchor portions includes an upright portion and an extension portion, the upright portion rising from the end side of the terminal portion toward the upper surface, the extension portion bending to extend from an upper end of the upright portion, the upright portion has an exposed region exposed from the bottom surface in a vicinity of a boundary with the end side, and an entire surface of the extension portion is in direct contact with the outer packaging resin.

2. The electrolytic capacitor according to claim 1, wherein the upright portion extends to form a right angle or an obtuse angle with the terminal portion.

3. The electrolytic capacitor according to claim 1, wherein the extension portion of one of the two anchor portions and the extension portion of another one of the two anchor portions extend away from each other.

4. The electrolytic capacitor according to claim 1, wherein each of the anode lead terminal and the cathode lead terminal includes the two anchor portions.

5. The electrolytic capacitor according to claim 1, wherein:
the exposed region of the upright portion has an inclined surface continuous with the principal surface of the terminal portion, and
the inclined surface is inclined to form an obtuse angle with the principal surface of the terminal portion.

6. The electrolytic capacitor according to claim 5, wherein an inclination angle θ of the inclined surface with respect to the principal surface of the terminal portion ranges from 135° to 175°, inclusive.

7. An electrolytic capacitor having a bottom surface and an upper surface opposite to the bottom surface, the electrolytic capacitor comprising:
a capacitor element including an anode lead;
an anode lead terminal and a cathode lead terminal each electrically connected to the capacitor element; and
outer packaging resin disposed around the capacitor element, wherein:
the anode lead terminal is constituted by a metal sheet and includes an anode terminal and an anode connection part, the anode terminal having a first principal surface and a second principal surface opposite to the first principal surface, the anode connection part being electrically connected to a tip of the anode lead,
the first principal surface is exposed from the bottom surface,
the anode terminal has a first region, a second A region, and a second B region, the first region being located at a center of the anode terminal, the second A region and the second B region being respectively located on both sides of the first region,
the anode connection part rises from the first region toward the upper surface, each of the second A region and the second B region includes a protrusion extending from the first region, the protrusion having a tip protruding from an end of the bottom surface, each of the protrusion in the second A region and the protrusion in the second B region has a side surface continuous with the first principal surface and the second principal surface, and the side surface of the protrusion in the second A region and the side surface of the protrusion in the second B region face each other and are inclined in directions different from each other with respect to the first principal surface and the second principal surface.

8. The electrolytic capacitor according to claim 7, wherein each of the side surface of the protrusion in the second A region and the side surface of the protrusion in the second B region is inclined to form an obtuse angle with the first principal surface.

9. The electrolytic capacitor according to claim 8, wherein an inclination angle of the each of the side surface of the protrusion in the second A region and the side surface of the protrusion in the second B region with respect to the first principal surface ranges from 100° to 135°, inclusive.

10. The electrolytic capacitor according to claim 7, wherein:

in the anode lead terminal, two anchor portions extend from each of the second A region and the second B region, the two anchor portions being embedded in the outer packaging resin, each of the second A region and the second B region has an end side along a longitudinal direction of the anode lead, and each of the two anchor portions includes an upright portion and an extension portion, the upright portion rising from the end side toward the upper surface, the extension portion bending to extend from an upper end of the upright portion.

11. The electrolytic capacitor according to claim 10, wherein an entire surface of the extension portion is in contact with the outer packaging resin.

12. The electrolytic capacitor according to claim 10, wherein the extension portion of one of the two anchor portions and the extension portion of another one of the two anchor portions extend away from each other.

13. An electrolytic capacitor having a bottom surface and an upper surface opposite to the bottom surface, the electrolytic capacitor comprising:

a capacitor element including an anode lead;

an anode lead terminal and a cathode lead terminal each electrically connected to the capacitor element; and outer packaging resin disposed around the capacitor element, wherein:

at least one of the anode lead terminal or the cathode lead terminal is constituted by a metal sheet and includes a terminal portion and two anchor portions, the terminal portion being partially exposed from the bottom surface, the two anchor portions each extending from the terminal portion toward an inside of the outer packaging resin, the terminal portion has a principal surface and an end side, the principal surface being exposed from the bottom surface, the end side being along a longitudinal direction of the anode lead, each of the two anchor portions includes an upright portion and an extension portion, the upright portion rising from the end side of the terminal portion toward the upper surface, the extension portion bending to extend from an upper end of the upright portion, the upright portion has an exposed region exposed from the bottom surface in a vicinity of a boundary with the end side, the principal surface of the terminal portion protrudes from a bottom surface of the outer packaging resin in a thickness direction of the terminal portion, the exposed region of the upright portion has an inclined surface continuous with the principal surface of the terminal portion, and the inclined surface is inclined to form an obtuse angle with the principal surface of the terminal portion.

14. The electrolytic capacitor according to claim 13, wherein an inclination angle θ of the inclined surface with respect to the principal surface of the terminal portion ranges from 135° to 175°, inclusive.

15. The electrolytic capacitor according to claim 13, wherein the upright portion extends to form a right angle or an obtuse angle with the terminal portion.

16. The electrolytic capacitor according to claim 13, wherein an entire surface of the extension portion is in contact with the outer packaging resin.

17. The electrolytic capacitor according to claim 13, wherein the extension portion of one of the two anchor portions and the extension portion of another one of the two anchor portions extend away from each other.

18. The electrolytic capacitor according to claim 13, wherein each of the anode lead terminal and the cathode lead terminal includes the two anchor portions.

19. The electrolytic capacitor according to claim 13, wherein the inclined surface is a curved shape.

* * * * *